United States Patent
Mireles et al.

(10) Patent No.: US 6,640,644 B1
(45) Date of Patent: Nov. 4, 2003

(54) APPARATUS AND METHOD FOR DETECTING TILT AND VIBRATION OF A BODY

(75) Inventors: Pedro G Mireles, Chihuahua (MX); Jose L Almaraz, Chihuahua (MX)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/199,570

(22) Filed: Jul. 19, 2002

Related U.S. Application Data

(63) Continuation-in-part of application No. 10/150,707, filed on May 17, 2002.

(51) Int. Cl.$^7$ ................................................. G01L 9/05
(52) U.S. Cl. ........................................... 73/721; 73/727
(58) Field of Search ........................... 73/115, 116, 721, 73/727; 338/4

(56) References Cited

U.S. PATENT DOCUMENTS

| | | | |
|---|---|---|---|
| 3,149,488 A | * 9/1964 | Castro | 73/862.68 |
| 4,373,397 A | * 2/1983 | Keller | 73/721 |
| 4,551,785 A | 11/1985 | Kröner | |
| 4,646,070 A | 2/1987 | Yasuhara et al. | |
| 4,924,702 A | 5/1990 | Park | |
| 4,933,852 A | * 6/1990 | Lemelson | 701/30 |
| 4,993,266 A | * 2/1991 | Omura et al. | 73/720 |
| 5,210,769 A | * 5/1993 | Seidel et al. | 73/295 |
| 5,249,468 A | * 10/1993 | Benedikt et al. | 73/706 |
| 5,274,335 A | 12/1993 | Wang et al. | |
| 5,503,023 A | * 4/1996 | Benedikt et al. | 73/726 |
| 5,518,590 A | 5/1996 | Fang | |
| 5,540,086 A | 7/1996 | Park et al. | |
| 5,546,005 A | 8/1996 | Rauchwerger | |
| 5,593,002 A | * 1/1997 | Okada et al. | 180/421 |
| 5,606,117 A | * 2/1997 | Vogel et al. | 73/115 |
| 5,687,687 A | * 11/1997 | Trueblood et al. | 123/196 S |
| 5,761,818 A | * 6/1998 | Hopkins et al. | 33/366.14 |
| 5,900,810 A | 5/1999 | Park et al. | |
| 5,907,278 A | * 5/1999 | Park et al. | 340/450.3 |
| 5,929,754 A | 7/1999 | Park et al. | |
| 5,947,372 A | * 9/1999 | Tiernan | 236/94 |
| 5,973,415 A | 10/1999 | Brenner et al. | |
| 5,992,231 A | 11/1999 | Mulder et al. | |
| 6,040,767 A | 3/2000 | Dykstra | |
| 6,239,709 B1 | 5/2001 | Dykstra et al. | |
| 6,240,778 B1 | * 6/2001 | Hannan et al. | 73/304 C |
| 6,250,152 B1 | 6/2001 | Klein et al. | |
| 6,253,601 B1 | 7/2001 | Wang et al. | |
| 6,268,737 B1 | 7/2001 | Marszalek | |
| 6,278,282 B1 | 8/2001 | Marszalek | |
| 6,339,742 B2 | 1/2002 | Weisman, II | |
| 6,459,995 B1 | * 10/2002 | Collister | 702/23 |

OTHER PUBLICATIONS

Delphi Automotive Systems "Sensors & Actuators INTELLEK™ Oil Condition Sensor".
Yingjie Lin et al, "Fluid Level Measuring System," USSN 09/481,220 filed Jan. 11, 2000.
Yingjie Lin, Method for Measuring Fluid Level, USSN 09/636,401 filed Aug. 10, 2000.
Carols Buelna et al, "Oil Condition Trend Algorithm," USSN 09/929,786 filed Aug. 14, 2001.

* cited by examiner

*Primary Examiner*—Hezron Williams
*Assistant Examiner*—Katina Wilson
(74) *Attorney, Agent, or Firm*—Margaret A. Dobrowitsky

(57) ABSTRACT

Tilt and vibration sensor and method for forming the sensor with a piezoresistive membrane having a weight affixed proximate its center for detecting the tilt and vibration of a body. The membrane may include four piezoresistors placed proximate the edges of the membrane at the points of maximum stress when the membrane is subject to a uniform applied pressure. The piezoresistors may form a Wheatstone bridge circuit to generate a first and second output voltage in response to changes in resistance of the piezoresistors under the uniform applied pressure. The first output voltage may be indicative of the angle of inclination of a body and the second output voltage may be indicative of the vibration of the body. The membrane may be fabricated from a silicon wafer using known photolithography and etching processes. The membrane may be connected with a voltage source and secured within an appropriate housing to be placed in an operational environment.

16 Claims, 2 Drawing Sheets

APPARATUS AND METHOD FOR DETECTING TILT AND VIBRATION OF A BODY

This application is a continuation-in-part of U.S. Ser. No. 10/150,707 filed May 17, 2002.

BACKGROUND OF THE INVENTION

The present invention relates in general to sensor assemblies and in particular to a sensor assembly including a piezoresistive membrane for detecting he tilt and vibration of a body and for generating output signals indicative of the tilt and vibration detection.

Today's automobiles and similar vehicles typically include highly sophisticated and complex systems and rely on control systems that receive input signals from a variety of sensing devices. Automobiles and similar vehicles powered by internal combustion engines depend on lubricating fluids such as oil for lubricating moving components of the engine and to help maintain the engine at a proper operating temperature. Oil refining and formulation itself has become a complex process to ensure that internal combustion engines are properly lubricated and cooled during operation while taking into account environmental conditions. It is well known that oil quality varies and that over time the level of oil within an engine may be reduced due to leaks and/or oil combustion and the condition of oil deteriorates. Consequently, numerous types of electronic sensors and sensor assemblies have been developed to monitor and/or detect oil level, oil temperature, and oil condition, for example. These sensors and assemblies may include algorithms that depend on determining whether a vehicle is parked on an incline and/or whether a vehicle's engine is running or shutdown. Oil level measuring algorithms are known in the art. Some are known to use averaging techniques to dampen the affect of an automobile being parked on an incline when the oil level measurement is taken. Other algorithms or methods may only take an oil level measurement when it is known that a vehicle is parked on a level surface.

Many tilt sensors are of the electrolytic type. A typical electrolytic sensor includes a glass or ceramic envelope that is partially filled with a conductive fluid. The fluid moves in response to tilting of the sensor where the fluid is under the influence of gravity, such as with a carpenter's spirit level. In other embodiments the fluid may be under the influence of the acceleration of a body. Platinum contacts may be sealed flush with the inside walls of the envelope. When such a sensor is at its zero position the electrical impedance of the fluid from the center electrode to each of the left and right electrodes is equal. Tilting the sensor disturbs this balanced condition and the impedance changes in proportion to the tilt angle. Cost and size of a typical electrolytic sensor limit their use in certain environments. Many electrolytic sensors are sensitive to temperature change and temperature compensation needs to be provided in most of the signal conditioning electronic units. Also, with respect to glass electrolytic sensors, great care must be afforded to the thermal and mechanical stress related characteristics of glass during installation and alignment. This may limit the range of applications of such sensors.

Another known category of tilt sensor types is switch sensors, which may be a variation of an electrolytic sensor. A switch type tilt sensor doesn't use a linear output with respect to inclination angle. Instead, a signal is generated once the inclination reaches a predetermined threshold.

While not used specifically for detecting the tilt of a body, a common structure for measuring pressure are pressure transducers. Pressure transducers may be diaphragm-based transducers that convert an applied pressure into stresses in the plane of the diaphragm. The stresses may be measured and converted into electrical signals by use of piezoresistive sensors that are an integral part of the diaphragm. Depending on the application, the diaphragm may be fabricated of metal or a semiconductor material such as silicon. Such configurations are known to be used in microphones, the automotive industry such as for checking tire, gas and air pressure, the biomedical industry such as for determining blood and fluid pressure, various instrumentation and vacuum sensing.

A known configuration for such an arrangement may be semiconductor devices with the resistive bridge legs formed such as by appropriate doping of selected portions of material in the semiconductor material. For example, U.S. Pat. No. 5,614,678 discloses a device using semiconductor material that is lightly doped N- or P-type silicon in a portion of the crystallographic plane. The piezoresistive elements of that device may be fabricated from P+ or P++ silicon in the crystallographic plane using known techniques. The piezoresistive sensing elements may be arranged in a Wheatstone bridge circuit so that two piezoresistors are positive changing and the other two are negative changing. The disclosed arrangement allows for an output voltage to be generated, which is indicative of an applied pressure on the device.

The condition of the lubricant such as the oil of an internal combustion engine is an important factor in determining whether fresh lubricant needs to be added to a system or whether the lubricant needs to be changed. Some such algorithms or methods may depend on an ignition signal to determine whether the engine is running or shutdown. Ignition signals are not always indicative of whether the engine is actually running or shutdown and may thereby adversely affect the oil condition algorithm or method.

Considering the cost and size advantages of using a semiconductor sensor relative to known tilt sensor types such as an electrolytic sensor, for example, it would be advantageous to provide a low cost semiconductor sensor for detecting tilt that could be adapted for a range of environments such as those requiring small scales in size. It would also be advantageous to provide a senor for accurately determining whether an automobile's engine was running or shutdown.

BRIEF SUMMARY OF THE INVENTION

An exemplary embodiment of an apparatus in accordance with one aspect of the present invention allows for the detection of certain operational parameters associated with a structure or a vehicle such as an automobile. For example, one exemplary embodiment may include an apparatus for detecting the tilt of the automobile relative to a reference position such as horizontal and vibration of the automobile. Vibration of the automobile may be used to determine whether the automobile's engine is running, e.g., the automobile has been started and the engine is idling or generating higher revolutions per minute ("RPM") than that of idling.

One exemplary embodiment of the present invention allows for electronic data indicative of engine running and vehicle tilt to be output from the apparatus and transmitted to a microcontroller or processor of the automobile for data analysis. The microcontroller or processor may send electronic signals indicative of output from the analyzed data to a display device such as a driver information center of an automobile, for example.

One exemplary embodiment for detecting tilt and vibration of a body in accordance with one aspect of the present invention takes advantage of the crystallographic structure and piezoresistive effect in semiconductor materials. The body may be a commercial or private vehicle, for example, or it could be any other physical structure where detecting tilt and/or vibration is desired. Such an apparatus may include a membrane where a plurality of piezoresistors may be diffused onto the membrane. A weight may be integral to the membrane and placed near the membrane's center. In one exemplary embodiment four piezoresistors are diffused onto or formed integral with the membrane to form a conventional Wheatstone bridge circuit. A constant voltage input may be applied to the membrane. A change in resistance of one or more of the piezoresistors may be used to create a first voltage output signal and a second voltage output signal by means of the Wheatstone bridge. The first voltage output signal may be responsive to the angular displacement or tilt of the membrane from a reference position such as horizontal. For example, the membrane may be formed within a substrate that is affixed to a body such as an automobile. When the automobile is tilted relative to horizontal the apparatus will generate an output signal indicative of the tilt. The second voltage output signal may be responsive to vibration of a body such as the vibration of an automobile caused by the automobile's engine running. The voltage outputs at any point in time from the Wheatstone bridge may be indicative of the stresses incurred by the membrane due to the membrane's tilting or sensation of vibration. This may allow for a qualitative or quantitative measurement of the membrane's angular displacement or tilt.

In one exemplary embodiment of the present invention two piezoresistors may be placed within the membrane perpendicularly or transverse to an applied stress and the other two may be placed parallel or longitudinally to the applied stress. The piezoresistors may be placed in locations that allow for maximum sensitivity of the sensors. This may be at or near the edges of the membrane where maximum stress occurs under an applied pressure. Sensor sensitivity may be defined as the ratio of change of voltage output to applied pressure. With no stress applied to the membrane in this configuration the voltage output is zero. As the applied pressure or stress is increased the voltage output will increase allowing for a determination of the membrane's angular displacement or tilt. One advantage of this configuration is that resistance changes resulting from temperature variations tend to cancel each other. In this respect, the sensor is at least partially immune to the effects of temperature.

The membrane according to one aspect of the present invention may be selected to have an appropriate thickness so that at least a portion of it will deflect in response to an applied pressure caused by a weight proximate the center of the membrane when the membrane is tilted. The deflection may stress the piezoresistors thereby changing their respective resistance value. A Wheatstone bridge circuit may be used to transform the changes in resistance value into the first voltage output, which may be indicative of the amount the membrane has tilted, and the second voltage output, which may be indicative of vibration of the automobile caused by its engine running. The composition of at least a portion of the membrane may be substantially of silicon or a silicon-based alloy provided that electrical isolation is achieved among the piezoresistors. The weight may be composed of a variety of suitable materials such as copper or nickel, for example, and be affixed or secured to the membrane by known techniques such as bonding or electrodeposition, for example.

One advantage of the apparatus or sensor in accordance with the present invention is that exemplary embodiments may be fabricated in varying sizes. Empirical simulation using commercially available finite element analysis software such as software from Ansys, Inc. demonstrates that the dimensions of the membrane and weight vary in proportion to one another and may consequently be adapted for a wide range of applications requiring specific size sensors.

Extending the life cycle of a vehicle's lubricant, such as motor oil, is important to today's commercial and private motorists. Monitoring lubricant level in an oil pan, for example, is an important indicator of whether new lubricant needs to be added or the existing lubricant needs to be changed. Taking single lubricant level readings may be misleading due to the angular displacement or tilt of the vehicle, the time after engine shutdown at which the reading is taken, lubricant temperature, sloshing of lubricant within the vehicle and a capillary effect that may delay lubricant return to an engine oil pan. Also, accurate level readings may be difficult if engine shutdown is determined by a microcontroller when the ignition signal feed to the level sensor switches from "1" to "0", for example. A problem with this approach is that the ignition signal used may remain in the "1" state even after the engine is shutdown in order to allow certain systems of an automobile to continue working after the ignition key is turned to the "off" position. Similarly, the ignition signal may be "on" when the key is in the accessory position. These situations could lead to a reduced number of level readings. One advantage of the present invention is that an accurate measurement of a vehicle's tilt can be made during and after engine shutdown and an oil level-measuring algorithm if desired may use this information.

Using ignition signal feeds to the sensor assembly may also adversely impact an oil condition trending algorithm, for example, in two ways. First, the number of real oil condition trend ("OCT") points may be reduced because the data for generating the OCT points is collected at predetermined intervals after engine shutdown. If the sensor assembly collecting the data for the OCT points determines shutdown by the ignition signal feed there will be an inherent delay in when the sensor will begin collecting data. The second adverse impact is that the fail-safe approach for odd conductivity behavior of lubricant could be thwarted. This fail-safe approach may assume that hours of ignition "on" are equivalent to hours of engine running, which would not be the case with the key in the accessory position. If the OCT points establish a trend that deviates from accepted performance specifications then a vehicle's main computer program may generate a change-oil-soon or a change-oil-now command. If one of these commands is triggered too soon then the oil of the vehicle may be prematurely changed.

An oil condition trending algorithm and/or an oil level-measuring algorithm, such as ones developed by the assignee of the present invention, stored within a processor of the automobile, may use the information generated by an exemplary embodiment of the present invention to overcome the difficulties noted above.

DETAILED DESCRIPTION OF THE INVENTION

Figure 1:
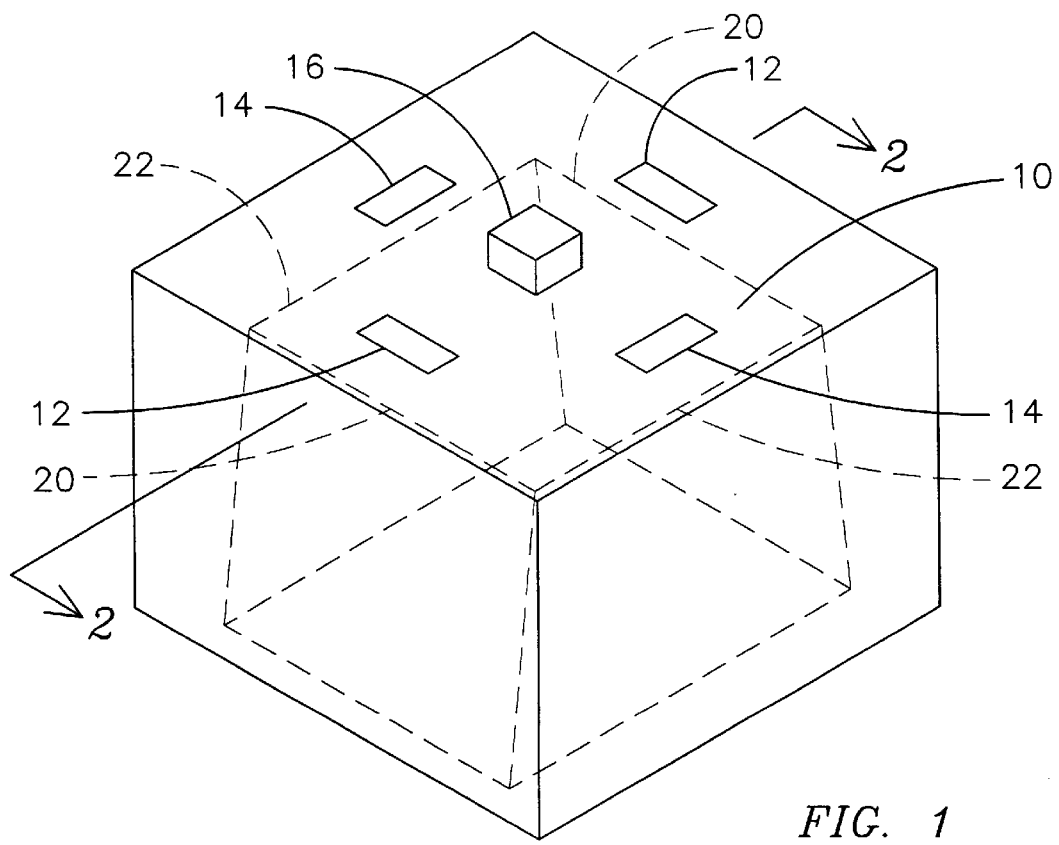
FIG. 1 is a perspective view of an exemplary embodiment of the present invention.

FIG. 1 illustrates an exemplary embodiment of a membrane 10 of the present invention. Membrane 10 may be fabricated from a silicon wafer such as a polysilicon, amorphous silicon or single crystal silicon, for example, using known techniques such as photolithography and/or etching processes. Membrane 10 may have pairs of piezoresistive elements, or piezoresistors, 12 and 14, fabricated therein using conventional techniques. At least a portion of membrane 10 may be fabricated to deflect in response to the application of a uniform pressure applied to the membrane 10. This deflection may cause stress on the piezoresistors 12 and 14, which changes their resistance values. The piezoresistive effect varies as a function of the structure of the silicon's crystal lattice. Resistance in particular is dependent on changes in length and resistivity of the piezoresistor 12 and 14 caused by stress. The following equation applies:

$$R = \frac{rL}{A}$$

R = resistance
L = length
r = resistivity
A = area

The relationship between stress and resistance change for silicon may be expressed by:

$$\frac{\Delta R}{R} = \pi_L \sigma_L + \pi_T \sigma_T \quad (1)$$

R = Resistance
ΔR = Resistance change
$\pi_L$ = Longitudinal piezoresistive coefficient
$\pi_T$ = Transverse piezoresistive coefficient
$\sigma_L$ = Longitudinal stress
$\sigma_T$ = Transverse stress Equation (1) includes two piezoresistive coefficients •$_L$ and •$_T$. These two piezoresistive coefficients are longitudinal and transverse as indicated by their respective subscripts. The longitudinal piezoresistive coefficient relates the relative resistance change due to an applied stress in a piezoresistive element 12 and 14 when the stress is in the same direction as the current flow through the element. The transverse piezoresistive coefficient relates the relative resistance change due to an applied stress in a piezoresistive element 12 and 14 when the stress is at right angles to the current flow through the elements. It should be noted that the transverse piezoresistive coefficient could be defined for a stress in the plane of the sensor as well as for a stress normal to that plane.

Figure 3:
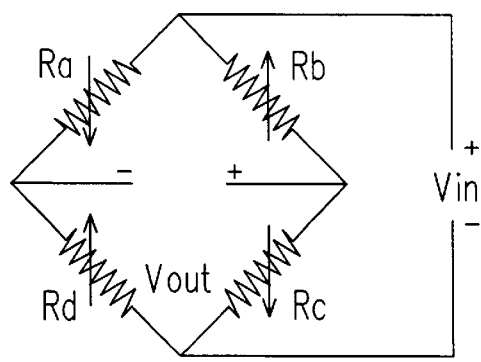
FIG. 3 is a schematic diagram of a Wheatstone bridge circuit used in an exemplary embodiment of the present invention.

The change in resistance of the piezoresistive elements 12 and 14, or piezoresistors, can be used to create a voltage output by means of a conventional Wheatstone bridge circuit shown in FIG. 3. In this respect, the resistance in the bridge legs changes in response to pressure applied to at least a portion of the membrane 10 that may act as a diaphragm and deflect in response to the pressure.

The membrane 10 may be fabricated to have a thickness in the range of about 10 to 50 μm for a 1000 μm square membrane 10. One aspect of the present invention allows for the thickness to vary as a function of the membrane's 10 dimensions. In one exemplary embodiment of the present invention membrane 10 has a thickness of approximately 20 μm. The thickness of membrane 10 may be selected as a function of a pressure range to be exerted on the membrane 10 during use. For example, empirical simulation conducted by the assignee of the present invention demonstrates by plotting pressure vs. deflection curves proximate the center of the membrane 10 that membrane 10, assuming a maximum deflection of 0.5 times the thickness of membrane 10, having a thickness of 20 μm establishes a practical pressure range for use of approximately 0 KPa to 961 KPa. Similarly, empirical simulation demonstrates that a membrane 10 having a thickness of 30 μm establishes a practical pressure range for use of approximately 0 KPa to 3200 KPa. These pressure ranges are well below the yield strength of silicon, for example, which is approximately 7000 MPa and defines the burst pressure of membrane 10 if fabricated of silicon. Consequently, one aspect of a method of the present invention allows for selecting a thickness for membrane 10 depending on the pressure range desired for a specific application of the tilt sensor.

The pairs of piezoresistors 12 and 14 may be fabricated within membrane 10 using known techniques such as photolithography and/or etching processes. Piezoresistors 12 and 14 may be placed within the 10 membrane 10 at locations where the maximum stress occurs in membrane 10 when subjected to a uniform pressure such as a uniform pressure applied normal to the upper surface 18. The piezoresistors 12 and 14 may be arranged to form a Wheatstone bridge circuit illustrated in FIG. 3. The change in resistance of the piezoresistors 12 and 14 caused by stress in membrane 10 may be used to create at least a first output voltage and a second output voltage. The transfer function for the circuit of FIG. 3 is defined by:

$$V_{out} = V_{in}\left(\frac{Rc}{Rb + Rc} - \frac{Rd}{Ra + Rd}\right)$$

Where Ra, Rb, Rc and Rd represent the resistors shown in FIG. 3. $V_{in}$ represents a voltage input, which may be constant, and $V_{out}$ represents a voltage output from the Wheatstone bridge circuit. A power source may be provided to supply the voltage input and may be a D.C. voltage of 2, 5 or 10 volts, for example. In one exemplary embodiment of the present invention the first pair of piezoresistors 12 are formed within membrane 10 perpendicular or transverse to the stress caused by a uniform pressure and the second pair of piezoresistors 14 are formed within membrane 10 to be parallel or longitudinal with the stress. This arrangement allows for the first pair of piezoresistors 12 to decrease in value and the second pair 14 to increase in value when the membrane 10 is under an applied uniform pressure. This relationship allows for the membrane 10 to be substantially immune from the affects of temperature. Any resistance change due to temperature should be cancelled because of the transfer function equation.

In one exemplary embodiment of the present invention, using Miller Indices notation, the piezoresistors 12 and 14 are aligned along the <110> direction and the silicon wafer surface (100), which forms a part of the upper surface 18 of membrane 10. Each of the first pair of piezoresistors 12, which are placed transverse to the stress, may have a width that allows for each one to be very close to an edge 20 of the membrane 10. The thickness of each pair 12 and 14 may be selected in order to have most of each piezoresistor as close to the upper surface 18 as possible and as far away from the midpoint of the membrane 10 thickness so that all piezoresistors are subjected only to tensile stress. The piezoresistor pairs 12 and 14 may also be subject to a compression stress. The length of each of the first pair 12 and second pair 14 may be selected so that the resulting resistor value is approximately 4000· to ensure that the current is not too large and so that the piezoresistors are not subject to too much heat. Alternate embodiments may use piezoresistors with other resulting resistor values depending on the specific application. Each of the second pair of piezoresistors 14, which are placed longitudinal to the stress, may be formed of two piezoresistors in series to minimize the distance from an edge 22 of the membrane 10, which maximizes the sensitivity per unit volume of the silicon membrane 10. This sensitivity may be defined as a change in voltage output in response to an input pressure. The length and width of each pair 14 may be selected to make the absolute resistance value equal to the value for the pair of transverse piezoresistors 12. Setting these resistance values equal allows for the output voltage to be zero when there is zero stress applied to the piezoresistors 12 or 14. The body of each pair of piezoresistors 14 may be kept close to an edge 22 where membrane 10 experiences maximum stress.

For example, in one exemplary embodiment of the present invention membrane 10 may be 1000 $\mu$m×1000 $\mu$m×20 $\mu$m with each of the transverse pair of piezoresistors 12 being approximately 100 $\mu$m×25 $\mu$m×2 $\mu$m and each of the longitudinal pairs being approximately 50 $\mu$m×25 $\mu$m×2 $\mu$m. In another embodiment the dimensions are the same except the membrane 10 is 30 82 m thick. The weight 16 may have a range of masses for these dimensions depending on the specific application.

Figure 2:
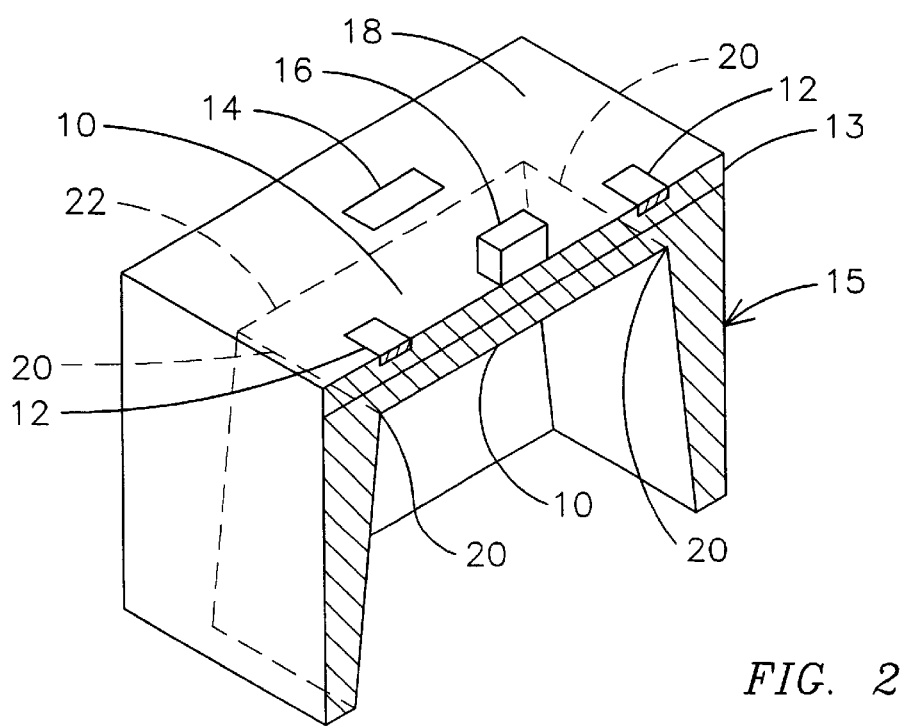
FIG. 2 is a cross sectional view of the exemplary embodiment of FIG. 1 taken along line 2—2 situated on a die or substrate.

The membrane 10 may be fabricated from the silicon wafer to form an upper layer 13 of a die or substrate, which is generally referred to as 15 as best shown in FIG. 2. The membrane 10 may be formed having a range of dimensions and shapes as will be recognized by those skilled in the art. A plurality of dies 15 may be fabricated from one silicon wafer using known techniques. A singulation step may be performed to separate the plurality of dies 15 as part of the fabrication process to form individual sensors. The die 15 may be fabricated with N-type dopant as is known in the art to provide electrical isolation among the piezoresistors 12 and 14, which may be fabricate with P-type dopant. In one exemplary embodiment of the present invention the piezoresistors 12 and 14 may be doped with boron at a doping concentration of approximately 1×10$^{17}$ atoms/cm$^3$. With this doping concentration of boron the transverse and longitudinal piezoresistive coefficients are almost the same with opposite signs. For example, the longitudinal piezoresistive coefficient may be about 71.8×10$^{-11}$/ Pa and the transverse coefficient may be about −66.3×10$^{-11}$/ Pa in the case of a silicon membrane 10. Also, with this doping concentration of boron the piezoresistive factor is equal to one so the piezoresistive coefficients given can be used without any correction. A doping concentration of boron atoms on at least a portion of a lower surface of the membrane 10 may be approximately 7×10$^{19}$/ cm$^3$ to provide for an effective back etch stop. The silicon density of the die 15 and the membrane 10 may be about 2.27×10$^3$ Kg/m$^3$.

One exemplary embodiment of the present invention allows for membrane 10 to be substantially square having length and width equal to approximately 1000 $\mu$m. Other dimensions may be used depending on the specific application. A weight 16 may be affixed to an upper surface 18 of membrane 10 by conventional techniques such as by using an appropriate adhesive, bonding or electrodeposition, for example. Weight 16 may be comprised of a range of suitable materials such as lead, gold, silver, copper, nickel or other metals or metal alloys, for example. In one exemplary embodiment weight 16 is substantially square and affixed to the upper surface 18 at or near the geometrical center of the membrane 10. In alternate embodiments the weight 16 may assume other shapes and at least a portion of it may be embedded in the upper surface 18 to help secure it in place. The weight 16 may be affixed to the membrane 10 before or after the singulation step of the wafer fabrication process. In. an alternate embodiment the weight 16 may be fabricated as part of membrane 10 so that a portion of the weight 16 is above the upper surface 18.

Figure 4:
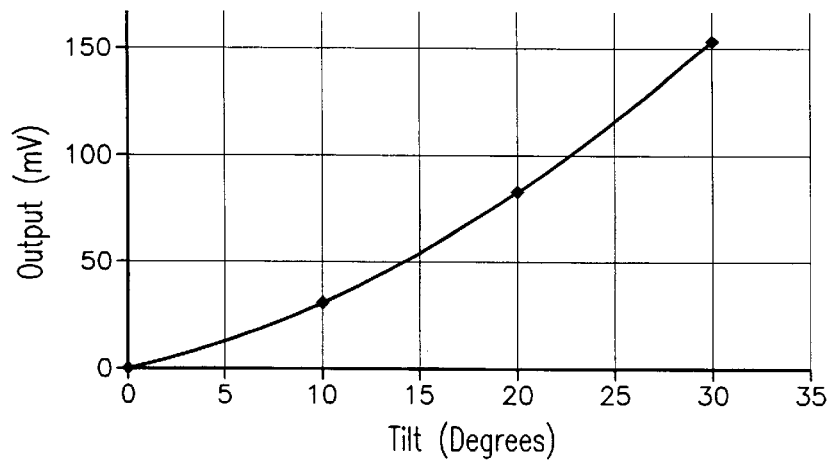
FIG. 4 is a graphical representation of the proportional response from the exemplary embodiment of FIG. 1 to changes in tilt angle.

Empirical simulations conducted by the assignee of the present invention demonstrate that for a membrane 10 with the dimensions of 500 $\mu$m×500 $\mu$m×30 $\mu$m having a 51 gram weight applied proximate to its center and with the membrane 10 having an elastic modulus of 169 MPa, a Poisson's ratio of 0.279 and a tensile strength of approximately 7000 MPa the stress concentrations along a portion of the edges 20 and 22 of the membrane 10 varied in response to a change in the angle of inclination of the member 10. The simulation demonstrates that as the angle of inclination from a reference position, such as horizontal, for example, increases the stress concentration decreases proportionately. The graph of FIG. 4 shows the proportional relationship between output voltage and the tilt of membrane 10 in degrees. In one exemplary embodiment of the present invention the output voltage indicative of tilt may only be used when the engine of an automobile, for example, is shutdown. In this respect, when the engine is shutdown the output voltage will not fluctuate and will output a signal that is proportional to the tilt angle. The output voltage will not fluctuate when the engine is shutdown because the weight 16 will not be vibrating in response to the engine running. Also, as the dimensions of the member 10 increase the mass of weight 16 may decrease.

The die or substrate 15 may be situated within a housing (not shown) so that the membrane 10 may be connected to known electronics for applying a voltage input across the piezoresistors 12 and 14. A variety of means are known in the art for reading and determining the output voltage signals in response to changes in resistance of the piezoresistors 12 and 14. Means are also well known for displaying the output voltage signal in terms of an angle of inclination, whether discrete values, threshold values or otherwise.

Figure 5:
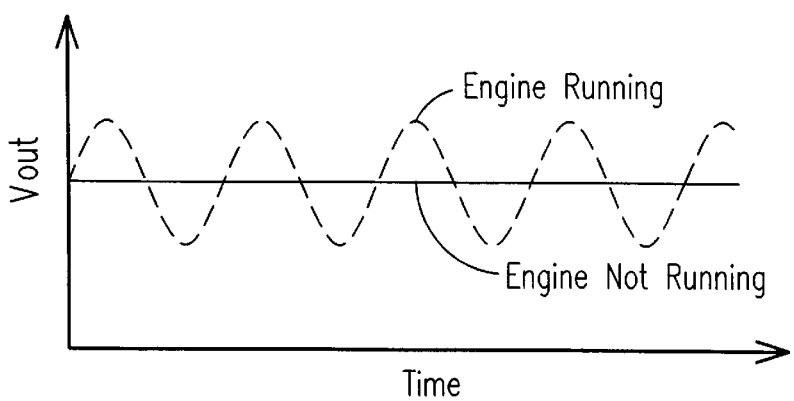
FIG. 5 is a graphical representation of the voltage output indicative of whether vibration has been detected.

FIG. 5 graphically illustrates the second voltage output signal indicative of when the engine of an automobile is running vs. when it is not running. The second voltage output signal may take the form of a sinusoidal wave or similar oscillating wave in response to the vibration of the weight 16 caused by the engine running. The vibration of the weight 16 creates changes in the stresses experienced by the piezoresistor pairs 12 and 14. When the engine is not running the second voltage output signal may be steady rather than oscillating. In an exemplary embodiment of the present invention, the oscillation of the second output voltage signal may be used by a microcontroller or processor associated with an automobile to generate an engine running condition signal using known techniques that may be used with an oil condition trending algorithm, for example. The microcontroller or processor may be associated with a main computer of an automobile or a sensor assembly such as an oil condition and level sensing assembly developed by the assignee of the present invention, for example. It will be recognized by. those skilled in the art that the second voltage output signal, being indicative of the vibration of a body, may be used for a wide range of purposes other than defining an engine running condition signal.

Figure 6:
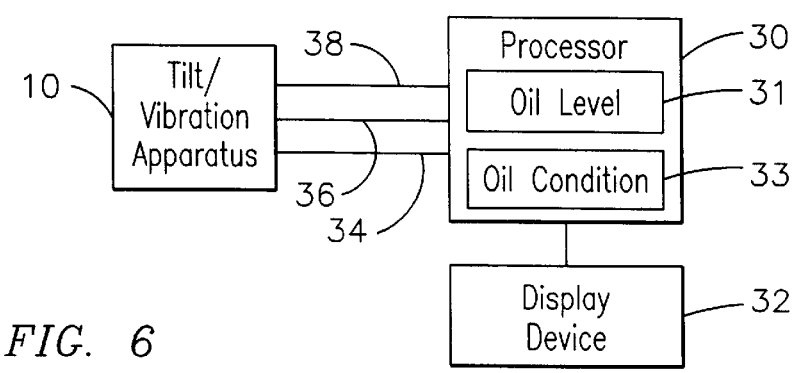
FIG. 6 is a schematic representation of one aspect of an exemplary embodiment of the present invention.

FIG. 6 is a schematic representation of the membrane 10, a processor 30 and a display device 32. In one exemplary embodiment the processor 30 and display device 32 may be integral to an internal combustion engine system such as that found in a commercial vehicle such as an automobile. The processor 30 may be a conventional processor and may include an oil level-measuring module 31 and an oil condition module 33. The membrane 10, which may be affixed to an automobile, for example, may be coupled with the processor 30 so that the processor may receive the first output voltage signal 34, the second output voltage signal 36 and the third output voltage signal 38. The processor 30 may be configured so that at least one of the first, second and third output voltage signals 34, 36 and 38 might be used with the oil level module 31 and/or the oil condition module 33. For example, in one exemplary embodiment the first output voltage signal 34 may be used with the oil level-measuring module 31 and the second output voltage signal 36 may be used with the oil condition module 33. As illustrated in FIG. 5, the second output voltage signal 36 may be indicative of the engine running and the third output voltage signal 38 may be indicative of the engine not running. The processor 30 may be coupled with a display device 32 such that the processor 30 may generate data indicative of oil level and oil condition that may be displayed on the display device 32. In one exemplary embodiment the display device 32 may be a conventional device found in the control panel of an automobile, for example.

While the exemplary embodiments of the present invention have been shown and described by way of example only, numerous variations, changes and substitutions will occur to those of skill in the art without departing from the invention herein. Accordingly, it is intended that the invention be limited only by the spirit and scope of the appended claims.

What is claimed is:

1. An apparatus for detecting operational parameters of vehicle having an internal combustion engine, the apparatus comprising:
   a substrate affixed to the vehicle;
   a membrane formed within the substrate, the membrane having an upper surface and adapted to receive an input voltage from a voltage source;
   a plurality of piezoresistors formed within the membrane, the plurality of piezoresistors configured to generate a first output voltage signal in response to a pressure applied to at least a portion of the membrane;
   a weight disposed on the upper surface, the weight adapted to apply the pressure when the substrate is at angle of inclination relative to a reference position, wherein the first output voltage signal is indicative of the angle of inclination of the substrate and constitutes one of the detected operational parameters of a vehicle; and
   a processor coupled to receive the first output voltage signal, the processor configured with at least an oil level measuring module and an oil condition module.

2. The apparatus of claim 1 wherein the first output voltage signal is received by the processor and used with the oil level measuring module.

3. The apparatus of claim 2 wherein the processor uses the first output voltage signal with the oil level-measuring module when the engine is shutdown.

4. The apparatus of claim 1 wherein the weight is adapted to vibrate when the internal combustion engine is running and the plurality of piezoresistors is configured to generate a second output voltage signal in response to the vibration of the weight, the second output voltage signal constituting one of the detected operational parameters of a vehicle.

5. The apparatus of claim 4 wherein:
   the processor is coupled to receive the second output voltage signal;
   the second output voltage signal is received by the processor and used with the oil condition module.

6. The apparatus of claim 5 wherein the processor uses the second output voltage signal to define an engine running condition signal.

7. The apparatus of claim 4 wherein:
   the plurality of piezoresistors is configured to generate a third output voltage signal in response to the internal combustion engine being shutdown, the third output voltage signal constituting one of the detected operational parameters of a vehicle;
   the processor coupled to receive the third output voltage signal; and
   the third output voltage signal is received by the processor.

8. The apparatus of claim 1, the plurality of piezoresistors comprising:
   a first pair of piezoresistors; and
   a second pair of piezoresistors.

9. The apparatus of claim 8 wherein:
   each of the first pair of piezoresistors is in a longitudinal position relative to an applied stress resulting from the pressure; and
   each of the second pair of piezoresistors is in a transverse position relative to the applied stress.

10. The apparatus of claim 9 wherein:
    a first one of the first pair of piezoresistors is located proximate a first edge of the membrane and a second one of the first pair of piezoresistors is located proximate a second edge of the membrane; and
    a first one of the second pair of piezoresistors is located proximate a third edge of the membrane and a second one of the second pair of piezoresistors is located proximate a fourth edge of the membrane.

11. The apparatus of claim 9 wherein:
    the first pair of piezoresistors each comprising two piezoresistors coupled in series circuit.

12. The apparatus of claim 1 wherein the plurality of piezoresistors are formed proximate the upper surface of the membrane so that each of the piezoresistors is essentially subject to at least one of a tensile stress and a compression stress resulting from the pressure.

13. The apparatus of claim 1 wherein the weight is disposed proximate a center portion of the upper surface.

14. The apparatus of claim 1 wherein each of the plurality of piezoresistors is doped with boron at a concentration on the order of approximately $1 \times 10^{17}$ atoms/cm$^3$.

15. The apparatus of claim 1 wherein the substrate and the membrane each has a silicon density on the order of approximately $2.27 \times 10^3$ Kg/m$^3$.

16. The apparatus of claim 1 wherein a portion of the weight is embedded within the upper surface of the membrane.

* * * * *